United States Patent
Heo et al.

(10) Patent No.: US 6,901,210 B1
(45) Date of Patent: *May 31, 2005

(54) MULTI-SESSION DISC HAVING A DVD APPLICATION SESSION, AND A RECORDING AND/OR REPRODUCING APPARATUS AND METHOD THEREOF

(75) Inventors: Jung-kwon Heo, Seoul (KR); Young-nam Oh, Seongnam (KR); Hyun-kwon Chung, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/534,493

(22) Filed: Mar. 24, 2000

(30) Foreign Application Priority Data

Mar. 25, 1999 (KR) .......................................... 1999-10270

(51) Int. Cl.⁷ ............................. H04N 5/85; H04N 7/04; H04N 9/79
(52) U.S. Cl. ........................ 386/125; 386/105; 386/45
(58) Field of Search ................................. 386/125, 126, 386/124, 123, 109, 111, 112, 105, 106, 104, 46, 45, 40, 39, 37, 27, 33, 1; H04N 5/85, 7/04, 19/79

(56) References Cited

U.S. PATENT DOCUMENTS 5,734,787 A * 3/1998 Yonemitsu et al. ......... 386/111
5,959,280 A * 9/1999 Kamatani ................... 369/52.1

FOREIGN PATENT DOCUMENTS

| EP | 0 797 205 A2 | 9/1997 |
|---|---|---|
| EP | 0 817 195 A2 | 1/1998 |
| EP | 0 878 799 A2 | 11/1998 |
| JP | 8-63901 | 3/1996 |
| JP | 8-180417 | 7/1996 |
| JP | 8-203210 | 8/1996 |
| JP | 8-227528 | 9/1996 |
| JP | 10-21673 | 1/1998 |
| JP | 10-40574 | 2/1998 |
| JP | 11-25607 | 1/1999 |
| JP | 11-53840 | 2/1999 |
| JP | 11-162114 | 6/1999 |
| KR | 98-082247 | 12/1998 |
| WO | WO 98/38637 | 3/1998 |

OTHER PUBLICATIONS

"Universal Disk Format Specification—Revision 1.50", Feb. 4, 1997 Optical Storage Technology Association XP002147696.

* cited by examiner

Primary Examiner—Robert Chevalier
(74) Attorney, Agent, or Firm—Stein, McEwen, Bui, LLP

(57) ABSTRACT

A multi-session disc having a digital versatile disc (DVD) application session, a recording/reproducing apparatus, and a recording/reproducing method, are provided. In this multi-session disc, which has a compact disc read only memory (CD-ROM) session, a lead-in area, a lead-out area and a user area, each having a compact disc read only memory (CD-ROM) format, are distinguished and digital versatile disc (DVD) application according to a predetermined file system is recorded in the user area. Therefore, the disc can be used for a music video or a presentation which requires a short reproduction time using a low-priced CD. Also, general CD players can reproduce audio information in an audio CD session, DVD players can reproduce a DVD application in a CD-ROM session, and audio CD players, which support a multi-session CD, can reproduce a DVD application as well as audio information.

29 Claims, 6 Drawing Sheets

MULTI-SESSION DISC HAVING A DVD APPLICATION SESSION, AND A RECORDING AND/OR REPRODUCING APPARATUS AND METHOD THEREOF

CROSS-REFERENCE TO RELATED APPLICATIONS

This application claims the benefit of Korean Application No. 99-10270, filed Mar. 25, 1999, in the Korean Patent Office, the disclosure of which is incorporated herein by reference.

BACKGROUND OF THE INVENTION

1. Field of the Invention

The present invention relates to the field of optical discs, and more particularly, to a multi-session disc having a digital versatile disc (DVD) application session, and a recording and/or reproducing apparatus for the same and a method thereof.

2. Description of the Related Art

A DVD video format is used to record and reproduce high image quality video data and/or high sound quality audio data having a transmission rate of about 10 Mbps (mega bits per second). However, DVDs are generally used by people who do large-scale marketing, such as film producers, since it is very expensive to manufacture DVDs.

At present, compact discs (CDs) have become much cheaper and even common users can directly manufacture CDs with the spread of the CD-R (Recordable). Also, 32x-speed CD drives are now on the market due to the development of new techniques for CD drives. General CDs include audio CDs, video CDs, and CD-ROMs. A CD-ROM is a disc having a logical format which is used for data recording by a computer in contrast to an audio CD or a video CD. The different types of CDs are differentiated by control information in a sub-Q area of a lead-in area and table of contents (TOC) information. If an audio CD is prescribed in the control information in the sub-Q area, the CD is immediately recognized as an audio CD. If general data other than that for the audio CD is prescribed in the control information in the sub-Q area, the CD is recognized as a video CD or a CD-ROM.

Given that the transmission rate of CDs is about 1.5 Mbps, 8x-speed or greater CD drives have a 10 Mbps or faster transmission rate. Therefore, data recording and reproduction at the same rate as the transmission rate of DVDs is possible. However, the recording time of CDs is much shorter than that of DVDs. Therefore, CDs cannot record data for a long period of time. However, CDs can be used when high image quality reproduction is required for a short time for applications such as clips for presentations or promotions.

Multi-session CDs can record at least two sessions having different formats such as an audio CD, a video CD and a CD-ROM. For example, on a multi-session CD, several audio CD sessions and CD-ROM sessions can co-exist. Here, the CD-ROM session denotes a session having a logical format used for data recording by computers, in contrast to an audio CD. The different sessions are distinguished by the TOC information in the lead-in area of a corresponding session of the disc. Presently, when the TOC information in the corresponding session indicates a CD-ROM, existing audio CD players can not reproduce the CD-ROM session.

Therefore, a multi-session CD shown in FIG. 1 is of a format designed so that only an audio CD session 1 is reproduced by general audio CD players. A CD-ROM session 2, on which data associated with the audio CD session is recorded, is used for computers or the like.

If a DVD application is recorded on the CD-ROM session existing on the multi-session CD, as is proposed by the present invention, general CD players reproduce the audio information in the audio CD session and DVD players reproduce the DVD application in the CD-ROM session. If a single album for an audio CD is produced, songs and musical performances can be recorded on the audio CD session and the music video or the like for each song can be recorded on the CD-ROM session.

However, existing multi-session CD recorders cannot record such data. Thus, a new recorder is required. Existing CD/DVD dual-purpose players play only an audio CD by recognizing only an audio CD session. Therefore, a DVD application written to a CD-ROM session cannot be reproduced since DVD applications are not reproduced when a physical media used in existing CD/DVD dual-purpose players is a CD.

SUMMARY OF THE INVENTION

To solve the above problem, an object of the present invention is to provide a multi-session disc having a DVD application session.

Another object of the present invention is to provide a disc recording apparatus for recording DVD information on a multi-session disc having a DVD application session.

Still another object of the present invention is to provide a disc reproducing apparatus for reproducing a multi-session disc having a DVD application session.

Yet another object of the present invention is to provide a disc recording method of recording DVD information on a multi-session disc having a DVD application session.

Still yet another object of the present invention is to provide a disc reproducing method of reproducing information on a multi-session disc having a DVD application session.

Additional objects and advantages of the invention will be set forth in part in the description which follows and, in part, will be obvious from the description, or may be learned by practice of the invention.

To achieve the first object and other objects, there is provided a multi-session disc including a compact disc read only memory (CD-ROM) session in which a lead-in area, a lead-out area and a user area, each having a CD-ROM format, are distinguished and a DVD application formatted according to a predetermined file system is recorded in the user area.

To achieve the second object and other objects, there is provided a disc recording apparatus for recording data on a multi-session disc including a CD-ROM session in which a lead-in area, a lead-out area and a user area, each having a CD-ROM format, are distinguished. The apparatus includes an encoder to encode received audio and/or video (A/V) signals into a DVD format to provide an A/V stream, a first formatter to format the A/V stream according to a predetermined file system for DVD applications and a second formatter to write data formatted according to the predetermined file system to the user area, to format data for the lead-in area and the lead-out area according to a CD-ROM format, and to write the CD-ROM formatted data to the lead-in area and the lead-out area.

To achieve the third and other objects, there is provided a disc reproducing apparatus to reproduce data from a multi-session disc including a CD-ROM session in which a lead-in area, a lead-out area and a user area, each having a CD-ROM format, are distinguished, including: a differentiator to determine whether a disc loaded into a drive is a multi-session CD having a CD-ROM session, an analyzer to analyze whether a predetermined file system exists if it is determined by the differentiator that the disc is a multi-session CD having a CD-ROM session, a deformatter to deformat a DVD application in the user area when the predetermined file system exists, to provide deformatted data, and a decoder to decode the deformatted data to restore the original A/V signal.

To achieve the fourth object and other objects, there is provided a method of recording data on a multi-session disc having a CD-ROM session in which a lead-in area, a lead-out area, and a user area, each having a CD-ROM format, are distinguished, the method including encoding received audio and/or video (A/V) signals according to a DVD format to provide an A/V stream, formatting the A/V stream according to a predetermined file system and writing data formatted according to the predetermined file system to the user area, formatting data for the lead-in area and the lead-out area according to a CD-ROM format and writing CD-ROM formatted data to the lead-in area and the lead-out area.

To achieve the fifth object and other objects, there is provided a method of reproducing data from a multi-session disc having a CD-ROM session in which a lead-in area, a lead-out area and a user area, each having a CD-ROM format, are distinguished, the method including determining whether a disc loaded into a drive is a video CD, an audio CD or a multi-session CD having a CD-ROM session, determining whether a predetermined file system exists if it is determined in the previous step that the disc is a multi-session CD and that a corresponding session is a CD-ROM session, deformatting a DVD application on the user area of the disc when the predetermined file system exists to provide deformatted data and decoding the deformatted data to restore the original A/V signal.

BRIEF DESCRIPTION OF THE DRAWINGS

The above objects and advantage of the present invention will become more apparent by describing in detail preferred embodiments thereof with reference to the attached drawings in which.

DESCRIPTION OF THE PREFERRED EMBODIMENTS

Figure 1:
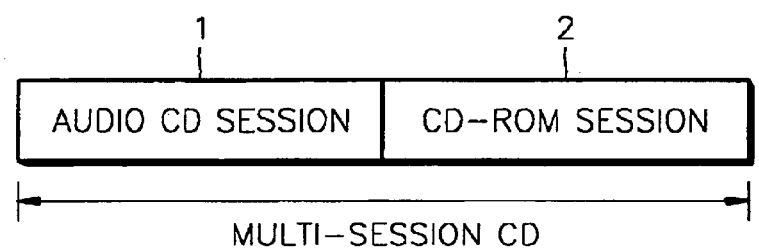
FIG. 1 is a view illustrating an example of a typical multi-session CD.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
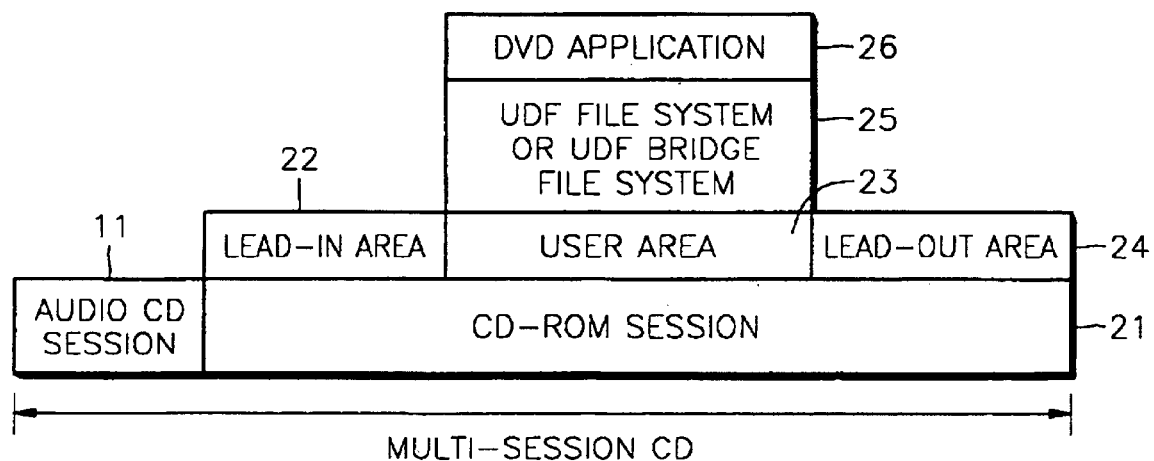
FIG. 2 is a view illustrating the structure of a multi-session disc according to the present invention.

An example of the structure of a disc according to the present invention is shown in FIG. 2 and a CD, a CD-R (Recordable) or a CD-RW (Rewritable) is used as the disc medium. In FIG. 2, an audio CD session 11 and a CD-ROM session 21 are defined on the multi-session CD. That is, a lead-in area 22, a user area 23 and a lead-out area 24 are distinguished in the CD-ROM session 21. Thus, both control information in the lead-in area 22 and TOC information use the same format as that of a general CD-ROM. For example, the control information recorded in a sub-Q area of the lead-in area does not correspond to that of an audio CD. That is, the format used on the CD-ROM session 21 is a type of format for a CD-ROM, which is different from the format of an audio CD or a video CD.

The logical format of the CD-ROM user area 23, according to the present invention, corresponds to a DVD format. The DVD format is based on a file system which is called a universal disk format (UDF). The specifications of a file system 25 for a DVD and a DVD application 26, which is based on the file system, have already been defined by the DVD forum.

In the disc of the present invention, as shown in FIG. 2, the lead-in area 22 and the lead-out area 24 are recorded according to a CD-ROM format. The logical volume area of the user area 23 records the DVD application 26 according to the file system 25, such as a UDF file system or a UDF bridge format. Here, the UDF bridge format is a format where a UDF and an international standard organization (ISO) 9660 format, which is used in general CD-ROMs, coexist. A CD-ROM drive installed in a computer requires the ISO 9660 format to read a disc. Therefore, the UDF bridge format is used. However, the file system format can include only the UDF if the formats for the file system are all changed into the UDF after a period of time.

Figure 3:
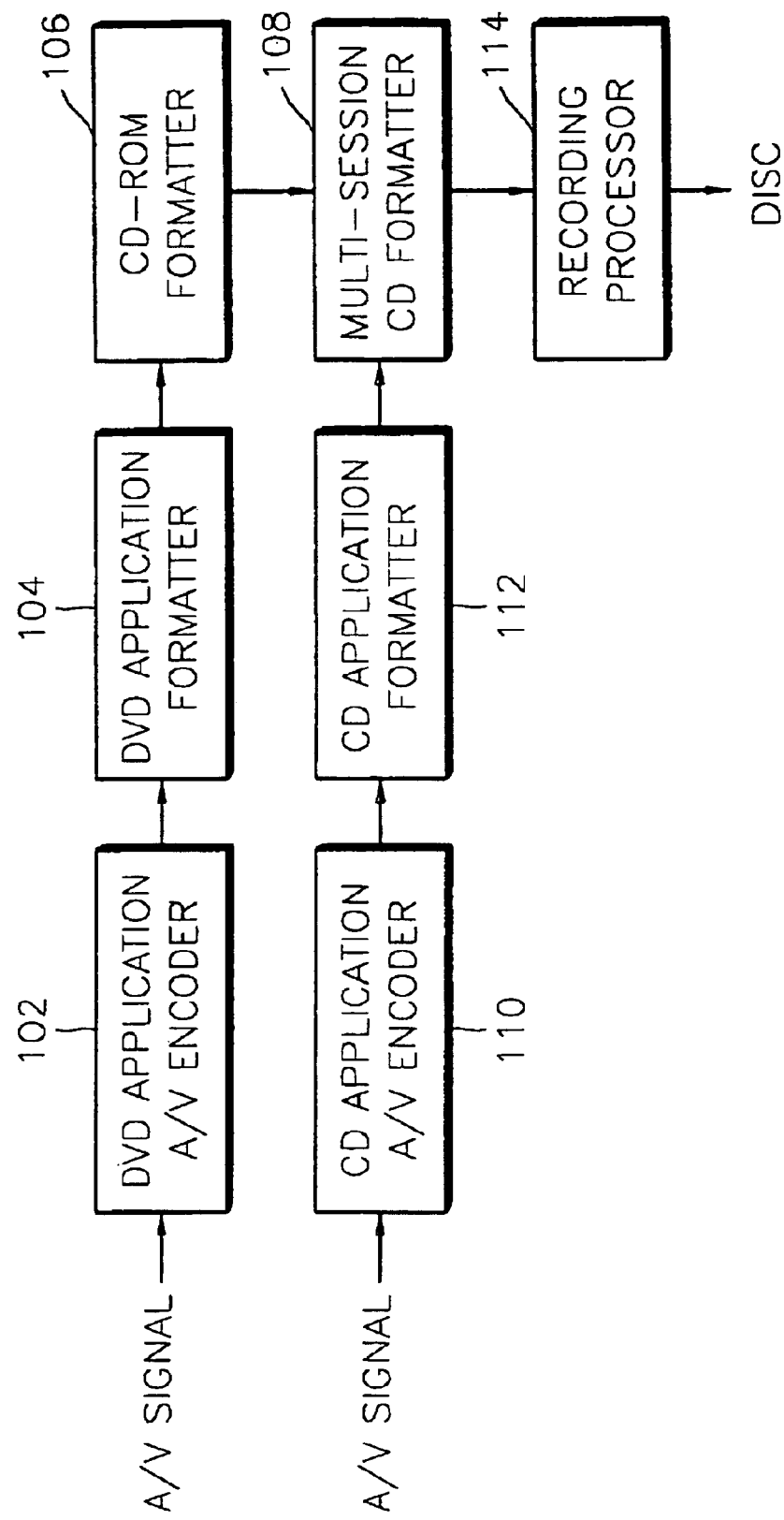
FIG. 3 is a block diagram illustrating a recording apparatus according to an embodiment of the present invention.

FIG. 3 is a block diagram illustrating an embodiment of a disc recording apparatus according to the present invention, including a DVD application A/V encoder 102, a DVD application formatter 104, a CD-ROM formatter 106, a multi-session CD formatter 108, a CD application A/V encoder 110, a CD application formatter 112 and a recording processor 114.

The DVD application A/V encoder 102 encodes received audio and/or video signals in accordance with a DVD application. If a video signal is received, it is coded using a specification which is defined in a DVD video application book and a coded video stream is provided. If an audio signal is received, it is encoded using a specification which is defined in a DVD audio application book and an encoded audio stream is provided. The DVD application formatter 104 formats the encoded A/V streams received from the DVD application A/V encoder 102 and the information associated with the corresponding streams using a file system of a UDF or a UDF bridge format.

The CD-ROM formatter 106 writes the DVD application formatted data received from the DVD application formatter 104 to the user area, respectively, on the CD-ROM session and writes lead-in data and lead-out data, which are defined according to the CD-ROM format, to the lead-in area and the lead-out area on the CD-ROM session. Thus, the CD-ROM formatter 106 provides CD-ROM formatted data to the multi-session CD formatter 108.

The CD application A/V encoder 110 encodes received A/V signals in accordance with a CD application. The CD application formatter 112 formats the encoded A/V signals received from the CD application A/V encoder 110 using a CD application format, to provide CD application formatted data to the multi-session CD formatter 108.

The multi-session CD formatter 108 writes CD application formatted data received from the CD application formatter 112 in an audio session format or a video session format and writes CD-ROM formatted data received from the CD-ROM formatter 106 in a CD-ROM session format, thereby forming a multi-session CD. The recording processor 114 signal-processes multi-session CD formatted data received from the multi-session CD formatter 108, to record the resultant data on a CD.

Figure 4:
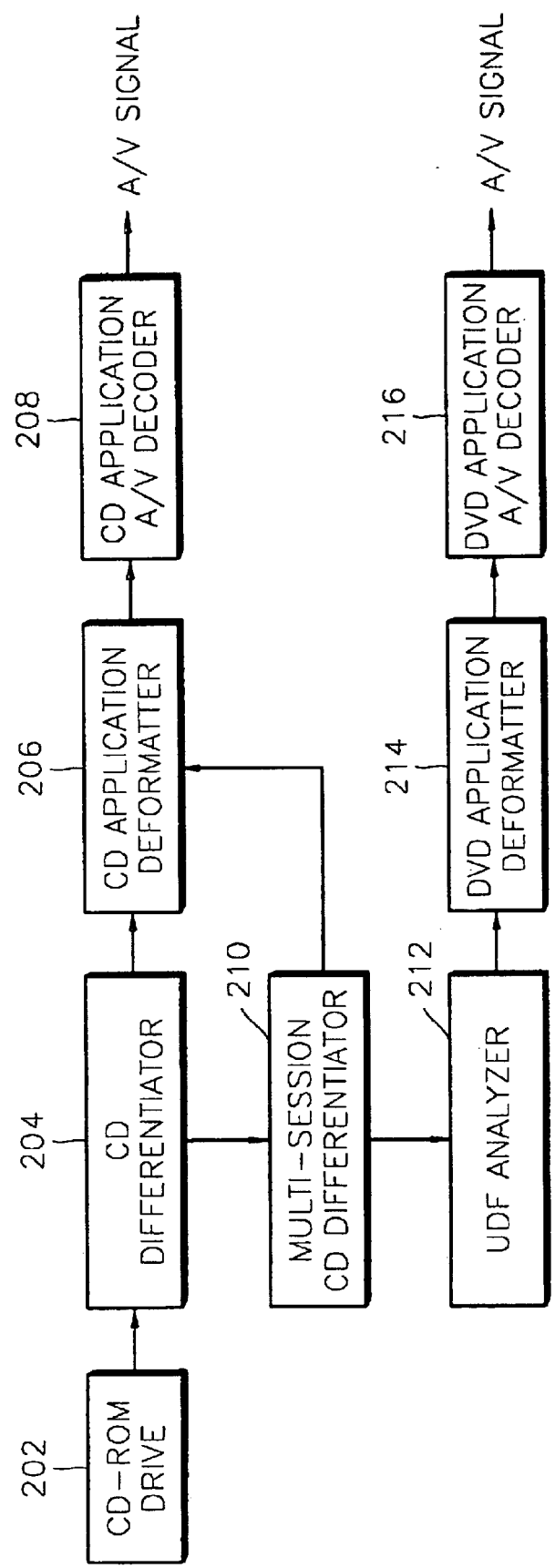
FIG. 4 is a block diagram illustrating a reproducing apparatus according to an embodiment of the present invention.

FIG. 4 is a block diagram illustrating an embodiment of a reproducing apparatus according to the present invention. The reproducing apparatus includes a CD-ROM drive 202, a CD differentiator 204, a CD application deformatter 206, a CD application A/V decoder 208, a multi-session CD differentiator 210, a UDF analyzer 212, a DVD application deformatter 214 and a DVD application A/V decoder 216.

When a disc is loaded into the CD-ROM drive 202, which supports an 8×-speed or faster transmission rate and accesses an audio CD, a video CD, and a multi-session CD, the CD differentiator 204 determines whether the loaded disc is a general audio CD or a general video CD. That is, the CD differentiator 204 determines whether the disc loaded into the CD-ROM drive 202 is an audio CD using the control information in the sub-Q area of the lead-in area on the disc. If it is determined that the disc is not an audio CD, the CD differentiator 204 analyzes TOC information to determine whether the disc is a video CD. Then, the CD differentiator 204 provides a differentiation signal representing that the loaded disc is either an audio CD or a video CD to the CD application deformatter 206. On the other hand, if it is determined that the disc is neither an audio CD nor a video CD, the CD differentiator 204 provides a differentiation signal representing the result of the determination to the multi-session CD differentiator 210.

The CD application deformatter 206 deformats data which has been picked up from the disc according to the differentiation signal representing that the loaded disc is either an audio CD or a video CD in accordance with an audio CD application or a video CD application. The CD application A/V decoder 208 decodes CD application deformatted data to output the original A/V signal.

The multi-session CD differentiator 210 analyzes the TOC information again to determine whether the loaded disc is a multi-session CD having a CD-ROM session if the differentiation signal representing that the loaded disc is neither an audio CD nor a video CD is received from the CD differentiator 204. If it is determined that the loaded disc is a multi-session CD and a corresponding session is a CD-ROM session, a differentiation signal representing the result of the determination is provided to the UDF analyzer 212. If it is determined that the loaded disc is a multi-session CD and a corresponding session is an audio CD session or a video CD session, a differentiation signal representing the result of the determination is provided to the CD application deformatter 206.

The UDF analyzer 212 determines whether a UDF file system exists on the CD-ROM session if the differentiation signal representing that the loaded disc is a multi-session CD and a corresponding session is a CD-ROM session is received from the multi-session CD differentiator 210. If it is determined that the disc has a UDF file system and that the file system is used for a DVD application, the DVD application deformatter 214 deformats DVD application deformatted data read from the disc. The DVD application A/V decoder 216 decodes DVD application deformatted data to output the original A/V signal.

The reproducing apparatus shown in FIG. 4 plays general CDs (e.g., an audio CD and a video CD) and a multi-session CD proposed by the present invention in which a DVD application session is included. However, the present invention is also applicable to an apparatus for playing only multi-session CDs, including a DVD application session, without playing general CDs. This apparatus includes the CD-ROM drive 202, the CD differentiator 204, the multi-session CD differentiator 210, the UDF analyzer 212, the DVD application deformatter 214 and the DVD application A/V decoder 216.

In FIG. 4, the CD differentiator 204 and the multi-session CD differentiator 210 are separately installed. However, a single differentiator can perform the determinations of the above two differentiators by analyzing the TOC information in the lead-in area. That is, for the single differentiator, if it is determined that the disc loaded into the CD-ROM drive 202 is either a video CD or an audio CD, a differentiation signal representing the result of the determination is provided to the CD application deformatter 206. If it is determined that the loaded disc is a multi-session CD and a corresponding session is a CD-ROM session, a corresponding differentiation signal is provided to the UDF analyzer 212. On the other hand, if it is determined that the loaded disc is a multi-session CD and a corresponding session is an audio CD session or a video CD session, a corresponding differentiation signal is provided to the CD application deformatter 206.

Figure 5:
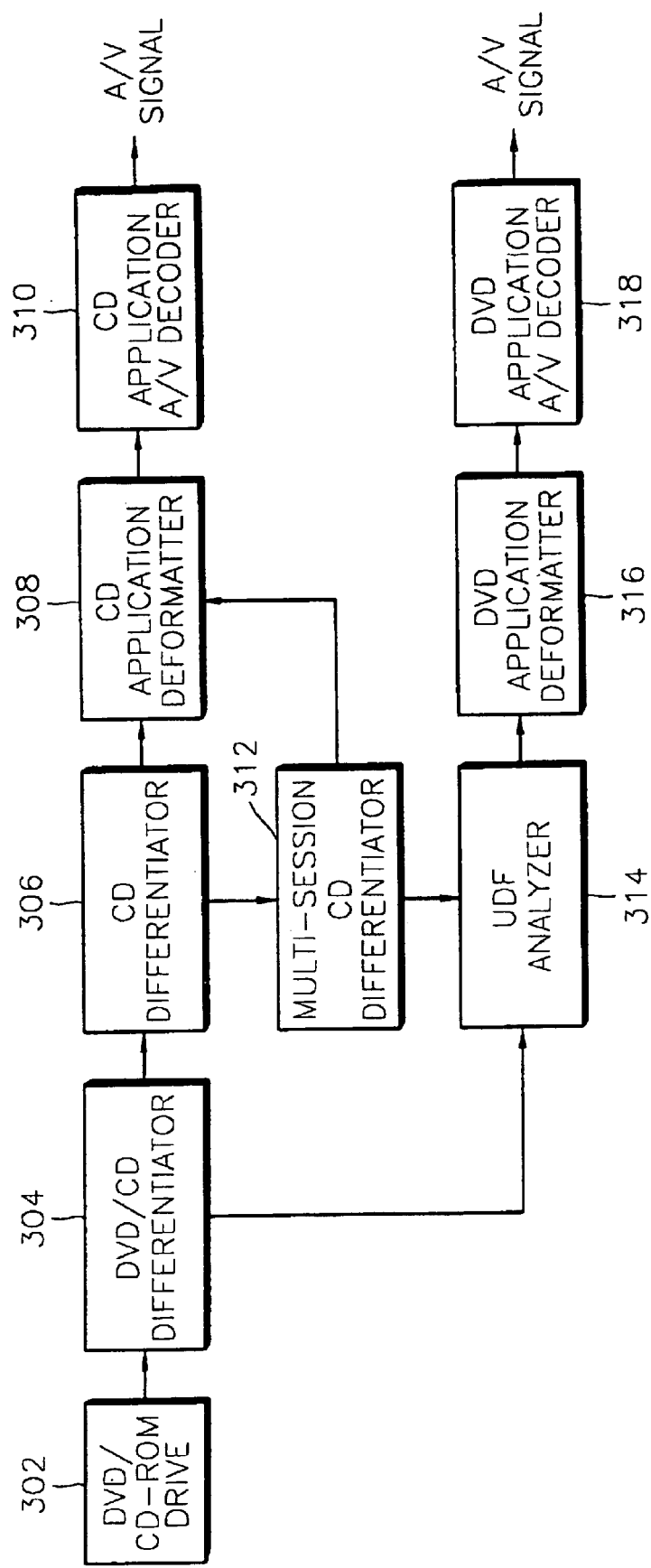
FIG. 5 is a block diagram illustrating a reproducing apparatus according to another embodiment of the present invention.

FIG. 5 is a block diagram illustrating another embodiment of a disc reproducing apparatus according to the present invention. The disc reproducing apparatus includes a DVD/CD-ROM drive 302, a DVD/CD differentiator 304, a CD differentiator 306, a CD application deformatter 308, a CD application A/V decoder 310, a multi-session CD differentiator 312, a UDF analyzer 314, a DVD application deformatter 316 and a DVD application A/V decoder 318 and can play both a general DVD and a disc proposed by the present invention in which a DVD application session is included.

The DVD/CD-ROM drive 302 can access a CD (an audio CD, a video CD and a multi-session CD), and particularly, has an 8×-speed or faster transmission rate when a loaded disc is a CD. The DVD/CD differentiator 304 determines the physical structure of the loaded disc. If the loaded disc has a physical structure corresponding to that of a CD, the DVD/CD differentiator 304 provides a differentiation signal representing that the physical structure of the disc corresponds to that of a CD to the CD differentiator 306. However, if the loaded disc has a physical structure corresponding to that of a DVD, the DVD/CD differentiator 304 provides a differentiation signal representing that the physical structure of the disc corresponds to that of a DVD to the UDF analyzer 314.

The CD differentiator 306 determines if the CD is an audio CD, a video CD, or neither an audio CD nor a video CD if the differentiation signal representing that the loaded disc is a CD is received from the DVD/CD differentiator 304. If the CD is either an audio CD or a video CD, the CD differentiator 306 provides a differentiation signal representing that the CD is either an audio CD or video CD to the CD application deformatter 308. If the CD is neither an audio CD nor a video CD, the CD differentiator 306 provides a differentiation signal representing the result of the determination to the multi-session CD differentiator 312.

The multi-session CD differentiator 312 determines whether the loaded disc is a multi-session CD having a CD-ROM session if it is determined that the loaded disc is neither an audio CD nor a video CD. If it is determined that the loaded disc is a multi-session CD and a corresponding session is a CD-ROM session, a corresponding differentiation signal is provided to the UDF analyzer 314. If it is determined that the loaded disc is a multi-session CD and a corresponding session is an audio CD session or a video CD session, a corresponding differentiation signal is provided to the CD application deformatter 308.

The structures and operations of the CD application deformatter 308, the CD application A/V decoder 310, the multi-session CD differentiator 312, the UDF analyzer 314, the DVD application deformatter 316 and the DVD application A/V decoder 318 are the same as those shown in FIG. 4, so they will not be described again.

Figure 6:
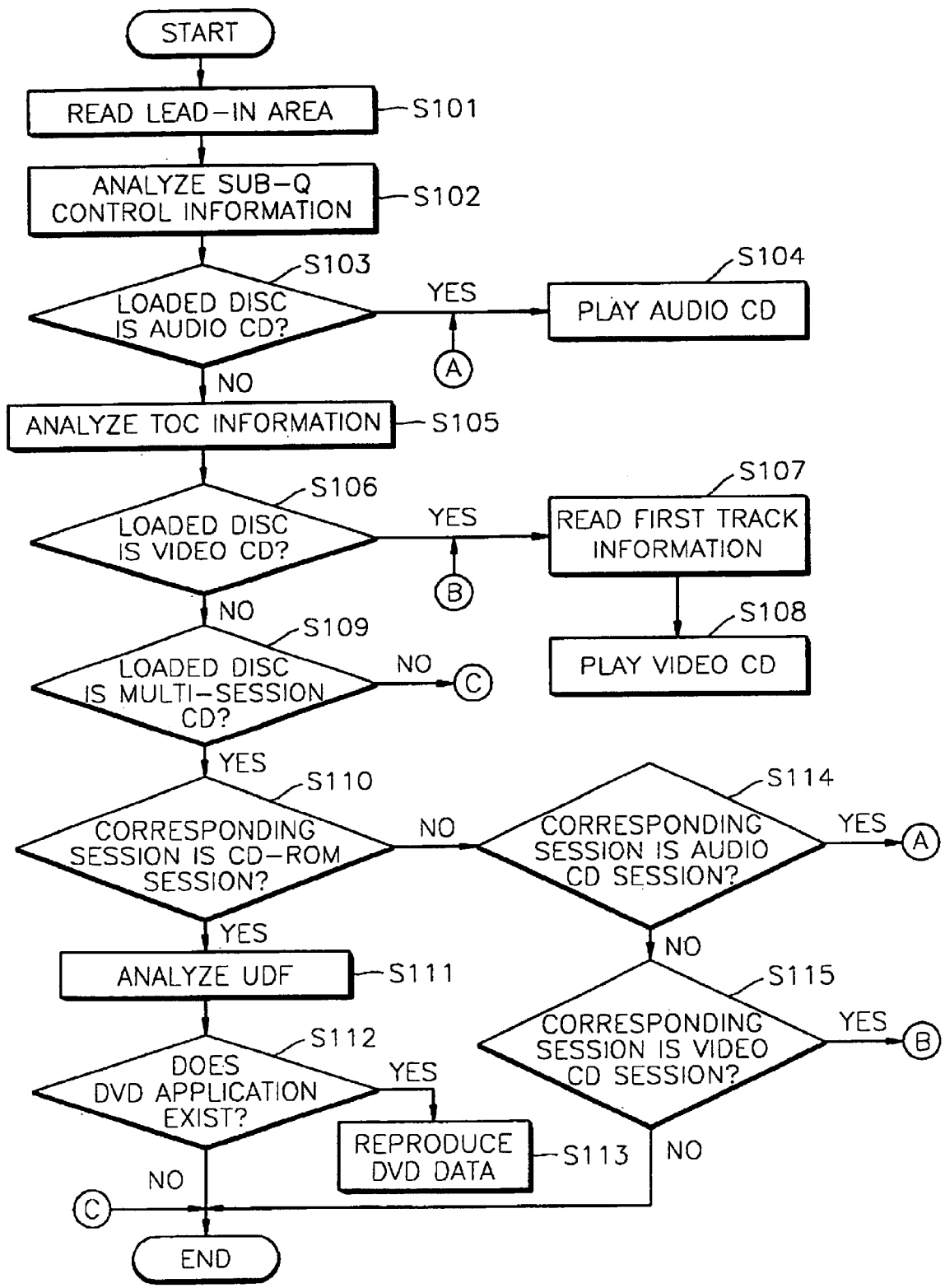
FIG. 6 is a flowchart illustrating a reproducing method according to an embodiment of the present invention.

FIG. 6, which is a flowchart illustrating an embodiment of a disc reproducing method according to the present invention, will now be described with reference to the disc reproducing apparatus shown in FIG. 4. First, the information in the lead-in area of a disc loaded into the CD-ROM drive 202 is read in step S101. Then, the control information in the sub-Q area of the lead-in area is analyzed in step S102. If it is determined in step S103 that the control information in the sub-Q area corresponds to that of an audio CD, an audio title stored on the audio CD is played in step S104. If it is determined in step S103 that the control information in the sub-Q area does not correspond to an audio CD, TOC information is analyzed in step S105.

If it is determined in step S106 that the analyzed TOC information corresponds to a video CD, video CD information is read from a first track of the disc in step S107. Then, a video title stored on the video CD is played according to the read first track information in step S108.

Another determination as to whether the loaded disc is a multi-session CD is made if it is determined in step S106 that the loaded disc is not a video CD according to the analyzed TOC information, in step S109. If the loaded disc is a multi-session CD, another determination as to whether a corresponding session is a CD-ROM session is made in step S110. If it is determined in step S110 that the corresponding session is a CD-ROM session, a UDF is analyzed in step S111 and, then, it is determined whether a DVD application exists in the CD-ROM session in step S112. If it is determined in step S112 that a DVD application exists, DVD data is reproduced in step S113. Otherwise, the disc reproducing process is concluded.

If it is determined in step S110 that the loaded disc is a multi-session CD but a corresponding session is not a CD-ROM session, another determination as to whether the corresponding session is an audio CD session is made in step S114. If the corresponding session is an audio CD session, the audio CD is played. Otherwise, a determination as to whether the corresponding session is a video CD session is made in step S115. If it is determined in step S15 that the corresponding session is a video CD session, the step S107 of analyzing the information recorded on the first track of the corresponding session is performed and, then, the video CD is played in step S108. Otherwise, the disc reproducing method is concluded.

Figure 7:
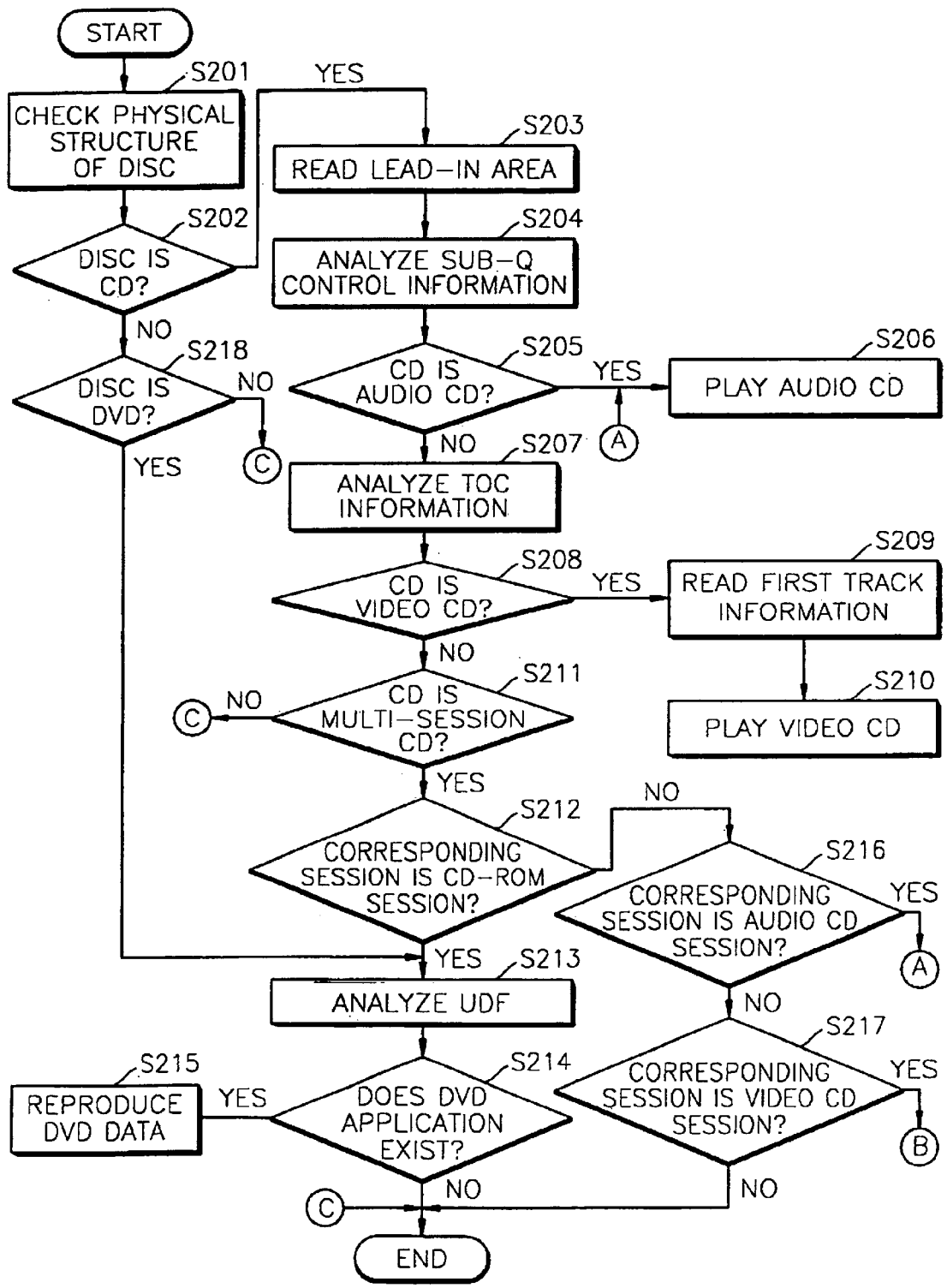
FIG. 7 is a flowchart illustrating a reproducing method according to another embodiment of the present invention.

FIG. 7, which is a flowchart illustrating another embodiment of a disc reproducing method according to the present invention, will now be described with reference to the reproducing apparatus shown in FIG. 5. In FIG. 7, the physical structure of a disc loaded into the DVD/CD-ROM drive 302 is checked in step S201. A determination as to whether the physical structure of the loaded disc corresponds to that of a CD is made in step S202. If the physical structure thereof corresponds to that of a CD, the control information in the lead-in area is read in step S203. Steps S203 through S217 are the same as the steps S101 through S115 shown in FIG. 6, so they will not be described again.

On the other hand, if it is determined in step S202 that the physical structure of the loaded disc does not correspond to that of a CD, another determination as to whether the physical structure thereof corresponds to that of a DVD is made in step S218. If it is determined in step S218 that the loaded disc is a DVD, the step S213 of analyzing a UDF is performed. Otherwise, the process is concluded.

As described above, the recording apparatus according to the present invention can record data, including a DVD application, on a multi-session CD and the multi-session CD can be reproduced by the reproduction apparatus according to the present invention. Also, the present invention can be used for music videos or presentations which require reproduction for a short period of time using low-priced CD media since DVD applications can be recorded on and reproduced from the CD media to obtain multiple functions, which is possible in DVD applications, with high image quality and high sound quality.

Since the disc proposed by the present invention is a multi-session CD, an audio CD session and a CD-ROM session, including a DVD application, can coexist on the disc. Therefore, general CD players will reproduce audio information, DVD players will reproduce the information from a DVD application and audio CD players, which can support a multi-session Cd including a DVD application, will reproduce the DVD application information as well as audio information.

What is claimed is:

1. A multi-session disc comprising:
   a compact disc read only memory (CD-ROM) session in which a lead-in area, a lead-out area and a user area, each having a CD-ROM format, are distinguished; and
   a digital versatile disc (DVD) application formatted according to a predetermined file system recorded in the user area.

2. The disc of claim 1, wherein the predetermined file system is a universal disc format (UDF).

3. The disc of claim 1, wherein the predetermined file system is a universal disc format (UDF) bridge format.

4. An apparatus to record/reproduce data on/from a multi-session CD including a CD-ROM session in which a lead-in area, a lead-out area and a user area, each having a CD-ROM format, are distinguished, comprising:
   a first encoder to encode received audio and/or video (A/V) signals into a DVD format to provide an A/V stream;
   a first formatter to format the A/V stream according to a predetermined file system for a DVD application; and
   a second formatter to write data formatted according to the predetermined file system to the user area, to format data for the lead-in area and the lead-out area in the CD-ROM format, and to write the CD-ROM formatted data to the lead-in area and the lead-out area.

5. The apparatus of claim 4, further comprising:
   a second encoder to encode the received audio and/or video (A/V) signals in accordance with a CD application format to provide the A/V stream;
   a third formatter to format the A/V stream received from the second encoder in the CD application format; and a fourth formatter to write the output of the second formatter in the CD-ROM session format and to write the output of the third formatter in the CD session format, to provide multi-session CD formatted data.

6. The apparatus of claim 4, wherein the predetermined file system is a universal disc format (UDF).

7. The apparatus of claim 4, wherein the predetermined file system is a universal disc format (UDF) bridge format.

8. The apparatus of claim 4, further comprising:
   a differentiator to determine whether a disc loaded into the apparatus is a video CD, an audio CD, or the multi-session CD having the CD-ROM session;
   an analyzer to analyze whether the predetermined file system exists on the multi-session CD if the differentiator determines that the disc is the multi-session CD having the CD-ROM session;
   a first deformatter to deformat the DVD application when the predetermined file system exists, to provide first deformatted data; and
   a first decoder to decode the first deformatted data to restore the A/V signals.

9. The apparatus of claim 8, further comprising:
   a second deformatter to deformat a CD application which has been read from the disc if the differentiator determines that the disc is either the video CD or the audio CD or that the disc is the multi-session CD and the CD-ROM session is an audio CD session or a video CD session, to provide second deformatted data; and
   a second decoder to decode the second deformatted data to restore the A/V signals.

10. The apparatus of claim 4, further comprising:
    a first differentiator to determine whether a disc loaded into the apparatus is a DVD or a CD by checking a physical structure of the disc;
    a second differentiator to determine whether the disc is a video CD, an audio CD or the multi-session CD having the CD-ROM session if the first differentiator determines that the disc is the multi-session CD;
    an analyzer to analyze whether the predetermined file system exists if the second differentiator determines that the disc is the multi-session CD having the CD-ROM session, or if the first differentiator determines that the disc is the DVD;
    a first deformatter to deformat the DVD application stored on the disc if the predetermined file system exists, to provide first deformatted data;
    a first decoder to decode the first deformatted data to restore the A/V signals;
    a second deformatter to deformat a CD application which has been read from the loaded disc if the second differentiator determines that the disc is either the video CD or the audio CD, or that the disc is the multi-session CD and that the CD-ROM session is an audio CD session or a video CD session, to provide second deformatted data; and
    a second decoder to decode the second deformatted data to restore the A/V signals.

11. A method of recording/reproducing data on/from a multi-session CD having a CD-ROM session in which a lead-in area, a lead-out area and a user area, each having a CD-ROM format, are distinguished, comprising:
    (a) encoding received audio and/or video signals into a DVD format to provide an A/V stream;
    (b) formatting the A/V stream according to a predetermined file system for a DVD application; and
    (c) writing the A/V stream formatted according to the predetermined file system to the user area, formatting data for the lead-in area and the lead-out area in the CD-ROM format, and writing the CD-ROM formatted data to the lead-in area and the lead-out area, to provide first formatted data.

12. The method of claim 11, further comprising:
    (d) encoding the received audio and/or video signals in accordance with a CD application to provide the A/V stream;
    (e) formatting the A/V stream according to the CD application format to provide second formatted data; and
    writing the first formatted data according to the CD-ROM session format and writing the second formatted data according to the CD session format, to provide multi-session CD formatted data.

13. The method of claim 11, wherein the predetermined file system is a universal disc format (UDF).

14. The method of claim 11, wherein the predetermined file system is a universal disc format (UDF) bridge format.

15. The method of claim 11, further comprising:
    (d) determining whether a disc loaded into a drive is a video CD, an audio CD or the multi-session CD having the CD-OM session;
    (e) determining whether the predetermined file system exists if said step (d) determines that the disc is the multi-session CD having the CD-ROM session;
    (f) deformatting the DVD application on the user area of the disc when the predetermined file system exists and providing first deformatted data; and
    (g) decoding the first deformatted data to restore the A/V signals.

16. The method of claim 15, further comprising:
    (h) deformatting a CD application which has been read from the disc if said step (d) determines that the disc is the video CD or the audio CD, or that the disc is the multi-session CD and that the CD-ROM session is an audio CD session or a video CD session, to provide second deformatted data; and
    (i) decoding the second deformatted data to restore the A/V signals.

17. The method of claim 11, further comprising:
    (d) determining whether a disc loaded into a drive is an audio CD by analyzing control information in a sub-Q area of the lead-in area of the disc, and if the loaded disc is the audio CD, playing the audio CD, and otherwise, determining whether the disc is a video CD by analyzing top of contents (TOC) information;
    (e) analyzing the video CD information on a first track of the disc and playing the video CD according to the analyzed video CD information if said step (d) determines that the disc is the video CD and, if said step (d) determines that the disc is not the video CD, analyzing the TOC information to determine whether the disc is the multi-session CD including the CD-ROM session; and
    (f) analyzing the predetermined file system and reproducing the DVD data if said step (e) determines that the disc is the multi-session CD having the CD-ROM session.

18. The method of claim 11, further comprising:
    (d) determining whether a disc is a DVD or a CD by checking a physical structure of the disc;
    (e) determining whether the disc is an audio CD, a video CD or the multi-session CD having the CD-ROM session, if said step (d) determines that the physical structure of the disc corresponds to that of a CD;

(f) determining whether the predetermined file system exists if said step (d) determines that the physical structure of the disc corresponds to that of a DVD or if it is determined in said step (e) that the disc is the multi-session CD having the CD-ROM session;

(g) deformatting the DVD application read from the disc when the predetermined file system exists, to provide first deformatted data; and (h) decoding the first deformatted data to restore the A/V signals.

19. The method of claim 18, further comprising:

(i) deformatting a CD application which has been read from the disc if said step (e) determines that the CD is the video CD or the audio CD, or that the CD is the multi-session CD and that the CD-ROM session is an audio CD session or a video CD session, to provide second deformatted data; and (j) decoding the second deformatted data to restore the A/V signals.

20. The method of claim 11, further comprising:

(d) determining whether a disc is a DVD or a CD by analyzing a physical structure of the disc;

(e) determining whether the disc is an audio CD by analyzing control information in a sub-Q area of the lead-in area of the disc if said step (d) determines that the physical structure of the disc corresponds to that of a CD, and playing the audio CD if the disc is the audio CD, and, otherwise, determining whether the disc is a video CD by analyzing TOC information;

(f) analyzing video CD information on a first track of the disc and playing the video CD according to the analyzed video CD information if said step (e) determines that the disc is the video CD, and, if said step (e) determines that the disc is not the video CD, determining whether the CD is the multi-session CD having the CD-ROM session; and (g) analyzing the predetermined file system and reproducing DVD data if said step (e) determines that the disc has the physical structure of a DVD or if said step (f) determines that the CD is the multi-session CD having the CD-ROM session.

21. A multi-session compact disc comprising:

a session in a first area of the compact disc, the first area having a lead-in and/or lead-out area and a user area, each having a format according to a first format type; and an application having a second format type interfacing with the session according to a predetermined file system which communicates with the first format type is recorded in the user area.

22. The disc according to claim 21, wherein the first format type is a CD-ROM format and the second format type is a DVD format.

23. A method of recording on a multi-session disc divided into a lead-in area, a lead-out area and a user area, each having a CD-ROM format, comprising:

formatting an audio/video signal stream in a DVD format according to a predetermined file system for a DVD application; and writing the formatted audio/video signal stream to the user area having the CD-ROM format.

24. An apparatus to record on a multi-session disc divided into a lead-in area, a lead-out area and a user area, each having a CD-ROM format, comprising:

a first formatter to format an audio/video signal stream in a DVD format according to a predetermined file system for a DVD application; and a second formatter to write the formatted audio/video signal stream to the user area having the CD-ROM format.

25. An apparatus to reproduce data from a multi-session CD including a CD-ROM session in which a lead-in area, a lead-out area and a user area, each having a CD-ROM format, are distinguished, comprising:

a differentiator to determine whether a disc loaded into the apparatus is a video CD, an audio CD, or the multi-session CD having the CD-ROM session;

an analyzer to analyze whether a predetermined file system exists if the differentiator determines that the disc is the multi-session CD having the CD-ROM session;

a first deformatter to deformat a DVD application when the predetermined file system exists, to provide first deformatted data; and a first decoder to decode the first deformatted data to restore original A/V signals from the disc.

26. The apparatus of claim 25, further comprising:

a second deformatter to deformat a CD application which has been read from the disc if it is determined by the differentiator that the disc is either a video CD or an audio CD or that the disc is the multi-session CD and that the CD-ROM session is an audio CD session or a video CD session, to provide second deformatted data; and a second decoder to decode the second deformatted data to restore the original A/V signals.

27. A method of reproducing data from a multi-session CD including a CD-ROM session in which a lead-in area, a lead-out area and a user area, each having a CD-ROM format, are distinguished, comprising:

(a) determining whether the disc is a DVD or a CD by checking a physical structure of the disc;

(b) determining whether the disc is a video CD, an audio CD or the multi-session CD having the CD-ROM session step (a) determines that the disc is the CD;

(c) analyzing whether a predetermined file system exists if said step (b) determined that the disc is the multi-session CD having the CD-ROM session, or if said step (a) determines that the disc is the DVD;

(d) deformatting a DVD application stored on the disc if the predetermined file system exists, to provide first deformatted data;

(e) decoding the first deformatted data to restore original A/V signals from the disc;

(f) deformatting a CD application which has been read from the disc if said step (b) determines that the disc is either the video CD or the audio CD, or that the disc is the multi-session CD, and that the CD-ROM session is an audio CD session or a video CD session, to provide second deformatted data; and (g) decoding the second deformatted data to restore the original A/V signals.

28. An apparatus to record data on a physical layer of a multi-session optical disc which is divided into a lead-in area, a lead-out area and a user area, each having a first format type, comprising:

a first encoder to encode received audio and/or video signals into a second format type to provide an A/V stream;

a first formatter to format the A/V stream according to a predetermined file system for a application of the second format type; and a second formatter to write data formatted according to the predetermined file system to the user area, to format data for the lead-in area and the lead-out area according to the first format type, to write the data formatted according to the first format type to the lead-in area and the lead-out area.

29. A multi-session CD having a track pitch of approximately 1.6 μm, comprising:

an audio session comprising audio and/or video data stored in a first area of the CD according to a first format; and a CD-ROM session, including a DVD application stored in a second area of the CD, the second area adjacent to the first area, according to a CD-ROM session format, wherein the second area comprises a lead-in area storing table of contents information in the CD-ROM session format, a lead-out area storing lead-out data in the CD-ROM session format, and a user data area storing the DVD application interfacing with the CD-ROM session format.

* * * * *

UNITED STATES PATENT AND TRADEMARK OFFICE
CERTIFICATE OF CORRECTION

PATENT NO.     : 6,901,210 B1
DATED          : May 31, 2005
INVENTOR(S)    : Jung-Kwon Heo et al.

It is certified that error appears in the above-identified patent and that said Letters Patent is hereby corrected as shown below:

Column 10,
Line 13, insert -- (f) -- before "writing".
Line 24, change "CD-OM" to -- CD-ROM --.

Signed and Sealed this

Sixth Day of December, 2005

JON W. DUDAS
*Director of the United States Patent and Trademark Office*